(12) United States Patent
Pinkney et al.

(10) Patent No.: US 9,074,477 B2
(45) Date of Patent: Jul. 7, 2015

(54) CONNECTOR

(71) Applicants: Ian Pinkney, Lincoln (GB); Osarobo Famous Okhuahesogie, Lincoln (GB); Paul Eifion Roach, Lincoln (GB); Neil Ryan Thomas, Lincoln (GB); Ian Patrick Clare Brown, Nottingham (GB); Peter Kay, Lincoln (GB); Stephen Wilson, Lincoln (GB); David Leslie Smith, Welton Le Marsh (GB); Robert Neil George, Lincoln (GB); Paul Leslie Jacklin, Lincoln (GB); Geoff Kinpoy Ngao, Lincoln (GB); Kevin John Musson, Lincoln (GB); Matthew Elijah Moore, Lincoln (GB); Jamie Clare, Grantham (GB); Thomas Jarlath Murray, Lincoln (GB); Stuart Michael Potter, Burton-upon-Stather (GB); Christopher John Monaghan, Lincoln (GB); Alan Martin Taylor, Lincoln (GB); Francis Joseph Geoffrey Heyes, Lincoln (GB); Trevor Knighton, Doncaster (GB)

(72) Inventors: Ian Pinkney, Lincoln (GB); Osarobo Famous Okhuahesogie, Lincoln (GB); Paul Eifion Roach, Lincoln (GB); Neil Ryan Thomas, Lincoln (GB); Ian Patrick Clare Brown, Nottingham (GB); Peter Kay, Lincoln (GB); Stephen Wilson, Lincoln (GB); David Leslie Smith, Welton Le Marsh (GB); Robert Neil George, Lincoln (GB); Paul Leslie Jacklin, Lincoln (GB); Geoff Kinpoy Ngao, Lincoln (GB); Kevin John Musson, Lincoln (GB); Matthew Elijah Moore, Lincoln (GB); Jamie Clare, Grantham (GB); Thomas Jarlath Murray, Lincoln (GB); Stuart Michael Potter, Burton-upon-Stather (GB); Christopher John Monaghan, Lincoln (GB); Alan Martin Taylor, Lincoln (GB); Francis Joseph Geoffrey Heyes, Lincoln (GB); Trevor Knighton, Doncaster (GB)

(73) Assignee: NAPIER TURBOCHARGERS LIMITED, Lincoln, Lincolnshire (GB)

( * ) Notice: Subject to any disclaimer, the term of this patent is extended or adjusted under 35 U.S.C. 154(b) by 0 days.

(21) Appl. No.: 14/364,874

(22) PCT Filed: Dec. 12, 2012

(86) PCT No.: PCT/GB2012/053097
§ 371 (c)(1),
(2) Date: Jun. 12, 2014

(87) PCT Pub. No.: WO2013/093424
PCT Pub. Date: Jun. 27, 2013

(65) Prior Publication Data
US 2014/0369840 A1  Dec. 18, 2014

(30) Foreign Application Priority Data

Dec. 23, 2011  (GB) .................................. 1122236.1

(51) Int. Cl.
*F01D 5/02* (2006.01)
*F04D 29/20* (2006.01)
*F04D 29/26* (2006.01)
*F16D 1/076* (2006.01)
*F16D 1/08* (2006.01)

(52) U.S. Cl.
CPC ............. *F01D 5/025* (2013.01); *F04D 29/266* (2013.01); *F16D 1/076* (2013.01); *F16D 1/0858* (2013.01); *F16D 2300/08* (2013.01); *F01D 5/026* (2013.01); *F16D 1/0847* (2013.01)

(58) Field of Classification Search
CPC ............. F01D 5/00; F01D 5/02; F01D 5/025; F01D 5/021; F01D 5/04; F01D 5/043; F04D 29/20; F04D 29/22; F04D 29/263; F04D 29/266; F04D 29/28; F04D 29/264
USPC .......... 416/204 R, 204 A, 244 R, 244 A, 248, 416/179, 182–188; 415/229, 230, 216.1
See application file for complete search history.

(56) References Cited

U.S. PATENT DOCUMENTS

| | | | |
|---|---|---|---|
| 2,433,589 A * | 12/1947 | Adams | 415/47 |
| 4,832,573 A | 5/1989 | Dorski | |
| 5,176,497 A * | 1/1993 | Deacon et al. | 415/230 |
| 5,505,590 A | 4/1996 | Dohring | |
| 6,948,913 B2 * | 9/2005 | Heyes et al. | 416/204 R |
| 7,748,960 B1 * | 7/2010 | Marussich et al. | 416/244 A |
| 2005/0169764 A1 * | 8/2005 | Geoffrey Heyes et al. | 416/244 A |
| 2005/0232775 A1 * | 10/2005 | Thiele et al. | 416/204 R |
| 2007/0292268 A1 * | 12/2007 | Nishiyama et al. | 415/208.3 |
| 2010/0050633 A1 * | 3/2010 | Jennes et al. | 60/605.1 |
| 2010/0054944 A1 * | 3/2010 | Fledersbacher et al. | 416/204 A |

FOREIGN PATENT DOCUMENTS

| | | |
|---|---|---|
| DE | 102008056058 A1 | 2/2010 |
| EP | 0142334 A2 | 5/1985 |
| EP | 1130220 A2 | 9/2001 |
| EP | 1193370 A2 | 4/2002 |
| EP | 1394387 A2 | 3/2004 |
| EP | 1467062 A2 | 10/2004 |
| EP | 1803941 A1 | 7/2007 |
| GB | 15885857 A | 4/1981 |

* cited by examiner

*Primary Examiner* — Dwayne J White
*Assistant Examiner* — Joshua R Beebe
(74) *Attorney, Agent, or Firm* — Egbert Law Offices, PLLC

(57) ABSTRACT

A connector for connecting an impeller to a shaft is provided. The connector is formed as a unitary body. The connector has a sleeve portion which is frictionally connected on a radially outer surface of a shaft-side hub extension of the impeller. The connector further has a threaded portion carrying a thread which screws onto a corresponding threaded portion of the shaft, such that the connector provides a rotationally fixed connection between the impeller and the shaft. The hub extension has a central recess, and a part of the connector is inserted into the recess. The frictional connection between the sleeve portion and the radially outer surface of the hub extension transmits, in use, substantially all of the torque between the shaft and the impeller.

14 Claims, 5 Drawing Sheets

CONNECTOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a connector for connecting an impeller to a shaft, and in particular, but not exclusively, for connecting an impeller of a turbocharger to a turbocharger shaft.

2. Description of Related Art Including Information Disclosed Under 37 CFR 1.97 and 37 CFR 1.98

Turbocharger impellers are typically made of aluminium alloys to provide low rotational inertia with reasonable strength at a commercially-acceptable cost. Attachment of the impeller to the steel turbocharger shaft is achieved in various ways. For example, because of the relative weakness of aluminium and the small diameter of the shaft, one option is to provide the impeller with a steel insert containing a screw-threaded socket which can be threaded on to the shaft. This arrangement can take a higher torque than a connection in which the shaft is directly threaded into the aluminium body (the torque is proportional to the power transmitted across the joint, and so the impeller can be used at a higher pressure ratio than one in which there is a direct threaded connection).

Typically, such an insert is fitted into the impeller by shrink fitting; the aluminium body of the impeller is heated to expand the bore which is to receive the steel insert, while the insert is cooled, for example using liquid nitrogen, before being inserted into the bore. The resultant interference connection is restricted by the temperature to which the aluminium can be heated before its material properties are affected, and by the temperature to which the steel can be cooled.

While the arrangement described can perform satisfactorily, a problem can arise during cycling of the turbocharger from rest to full load. As the turbocharger starts to spin, the joint is affected by centrifugal forces, whereby the aluminium grows outwards away from the steel insert. This reduces the interference force between the insert and the impeller, and due to design constraints it has been found that this reduction tends to be greater at one end of the insert than at the other. Consequently, the insert is gripped more firmly at one of its ends than at the other. The turbocharger then starts to heat up, and because of the different thermal coefficients of expansion of the aluminium alloy and the steel, the aluminium grows axially more than the steel, causing the two metals to slide over each other, except at the location where the impeller still grips the insert firmly. On shutdown, the centrifugal stresses are removed, but the thermal stresses remain for some minutes as the turbocharger cools. In this process, the point of grip of the impeller on the insert changes from one end to the other, and as the turbocharger cools, the insert "walks" along the impeller.

In certain very cyclic conditions (for example fast ferry applications in high ambient temperatures), it has been observed that the insert can move so far along the impeller that turbocharger failure can occur. Although the effect can be mitigated to some degree by increasing the original interference between the components, for the reasons mentioned above this solution is limited, and it is therefore desirable to achieve a design which ensures that the point of grip remains at the same location during the operating cycles, rather than shifting from one end of the insert to the other.

Accordingly, EP1394387 proposes an outer steel constraining ring which reinforces the frictional contact between aluminium impeller and the insert. Since the ring does not expand as much as the impeller body as the turbocharger heats up, the point of grip between the impeller and the insert remains within the axial extent of the ring during the whole operating cycle of the turbocharger, thereby preventing the tendency of the impeller to "walk" along the insert. As a consequence, the operating life of the turbocharger can be considerably extended in comparison with the conventional turbocharger without the constraining ring.

However, such a solution involves two interference fit joints between steel and aluminium. These joints are complex and involve several tightly toleranced components, together with a detailed knowledge of the centrifugal and thermal loads that the joints will undergo during operation.

BRIEF SUMMARY OF THE INVENTION

It would be desirable to provide a simpler connection between an impeller and a shaft, but one that can transmit high torques and can prevent or reduce any tendency of the impeller to "walk".

Accordingly, in a first aspect the present invention provides a connector for connecting an impeller to a shaft, in particular for connecting an impeller of a turbocharger to a turbocharger shaft, wherein the connector is formed as a unitary body having:
 a sleeve portion which is frictionally connected on a radially outer surface of a shaft-side hub extension of the impeller, and
 a threaded portion carrying a thread which screws onto a corresponding threaded portion of the shaft such that the connector provides a rotationally fixed connection between the impeller and the shaft.

Advantageously, by forming the connector as a unitary body, the connection between the impeller and the shaft can be greatly simplified, e.g. with fewer high precision interfaces. Further, the connector is generally formed of a material having a greater strength than the material of the impeller and having a lower coefficient of thermal expansion than the material of the impeller. Thus during operation, as the impeller assembly heats up, the hub extension grows to a greater degree than the sleeve portion, whereby the joint between the hub extension and the sleeve tightens, reducing any tendency of the impeller to "walk" and increasing the torque capacity of the joint. Alternatively, because of this tightening of the joint, the degree of interference required on fitting the connector to the impeller can be reduced, while maintaining the "walk" resistance and torque capacity of the joint. Further, as the connector typically does not require an insert which frictionally connects to the hub extension by shrink fitting, heating of the impeller on fitting can be avoided, whereby material properties of the impeller may not be degraded by accelerated ageing during assembly.

A second aspect of the invention provides an impeller having a shaft-side hub extension and fitted with a connector according to the first aspect, the sleeve portion of the connector being frictionally connected on a radially outer surface of the hub extension.

A third aspect of the invention provides the impeller fitted with a connector of the second aspect, which impeller is connected to a shaft having a corresponding threaded portion, the thread of the threaded portion of the connector screwing onto the corresponding threaded portion of the shaft.

A fourth aspect of the invention provides a turbocharger having the connected impeller and shaft of the third aspect.

Optional features of the invention will now be set out. These are applicable singly or in any combination with any aspect of the invention.

The sleeve portion of the connector may be approximately cylindrically shaped. The outer surface of the shaft-side hub extension of the impeller may be correspondingly approximately cylindrical.

The frictional connection between the sleeve portion and the hub extension can be achieved by e.g. by press fitting or shrink fitting.

To provide the rotationally fixed connection, the threads can be positive-locking, e.g. tapered. However, another option is for the connector to have an abutment surface which engages a corresponding abutment surface of the shaft when the threaded portions are screwed together, thereby tightening the threads to provide the rotationally fixed connection.

The connector may be configured to contact the impeller only on the radially outer surface of the hub extension.

Alternatively, the hub extension may have an end face, and the connector may have an abutment portion which bears against the end face. In this case, the connector may be configured to contact the impeller only on the radially outer surface of the hub extension and the end face of the hub extension. Preferably the end face is at the radially outer side and impeller end of the hub extension so that "walking" of the impeller can be readily monitored by measuring any gap that opens up between the end face and the abutment portion.

Preferably, the frictional connection between the sleeve portion and the radially outer surface of the hub extension transmits, in use, substantially all of the torque between the shaft and the impeller.

The hub extension may have a central recess, and a part of the connector may be inserted into the recess. However, a clearance may be provided between that part of the connector and the side surface of the recess. Thus the connector may not contact the side surface of the recess, i.e. if the connector contacts a surface of the recess at all, it may only contact an end surface of the recess. Typically, the impeller does not have a through-hole extending from one side to another of the impeller. Thus generally the central recess is a blind hole (with an end face), the hole opening to the shaft-side end face of the hub extension.

When the hub extension has a central recess, the part of the connector inserted into the recess may include the threaded portion of the connector. In this way, an axially compact arrangement can be achieved.

The thread of the connector can face radially outwardly. For example, the threaded portion of the connector can be formed as a substantially cylindrical boss coaxial with the shaft, and the threads can be formed on a radially outer surface of the boss.

Alternatively, the thread of the connector can face radially inwardly. For example, the threaded portion can be included in the part of the connector inserted into the recess.

The connector may be formed of a material, such as steel and preferably high tensile steel, having a greater strength than the material (typically metal and more typically aluminium alloy) of the impeller and having a lower coefficient of thermal expansion than the material of the impeller.

The sleeve portion can extend over at least 50%, and preferably at least 80%, of the axial length of the hub extension. More preferably the sleeve portion can extend over substantially the entire axial length of the hub extension.

Frictional contact between the sleeve portion and the hub extension can extend over at least 25% of the axial length of the overlap region between the sleeve portion and the hub extension, preferably over at least 30% or 50% of the axial length of the overlap region, and more preferably over the entire axial length of the overlap region.

The connector and/or the impeller may have one or more centering portions having respective engagement surfaces which engage with one or more corresponding centering portions of the shaft, the threaded portion of the connector and the centering portions of the connector and/or the impeller being distributed along the impeller axis. The thread surface of the connector and the engagement surfaces of the connector and/or the impeller can face radially inwardly, and the respective diameters of the thread and the engagement surfaces can then decrease towards the impeller. Alternatively, the thread and engagement surfaces of the connector can face radially outwardly, and the respective diameters of the thread and the engagement surfaces can then increase towards the impeller.

Generally the impeller has a casing, and the sleeve portion can then form a seal with a section of the casing. For example, the seal can include a sealing ring, which may be carried by the casing section and which may be received by a corresponding circumferential recess formed on the outer surface of the sleeve portion. The sealing ring may have one or more annular grooves on its radially inner face, and the recess may have corresponding circumferential ribs which are received in the grooves. Another option is for the seal to include a labyrinth seal, with formations on facing surfaces of the casing section and the sleeve portion forming the labyrinth.

The sleeve portion may be formed with or may carry a circumferential oil thrower formation at its radially outer surface.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
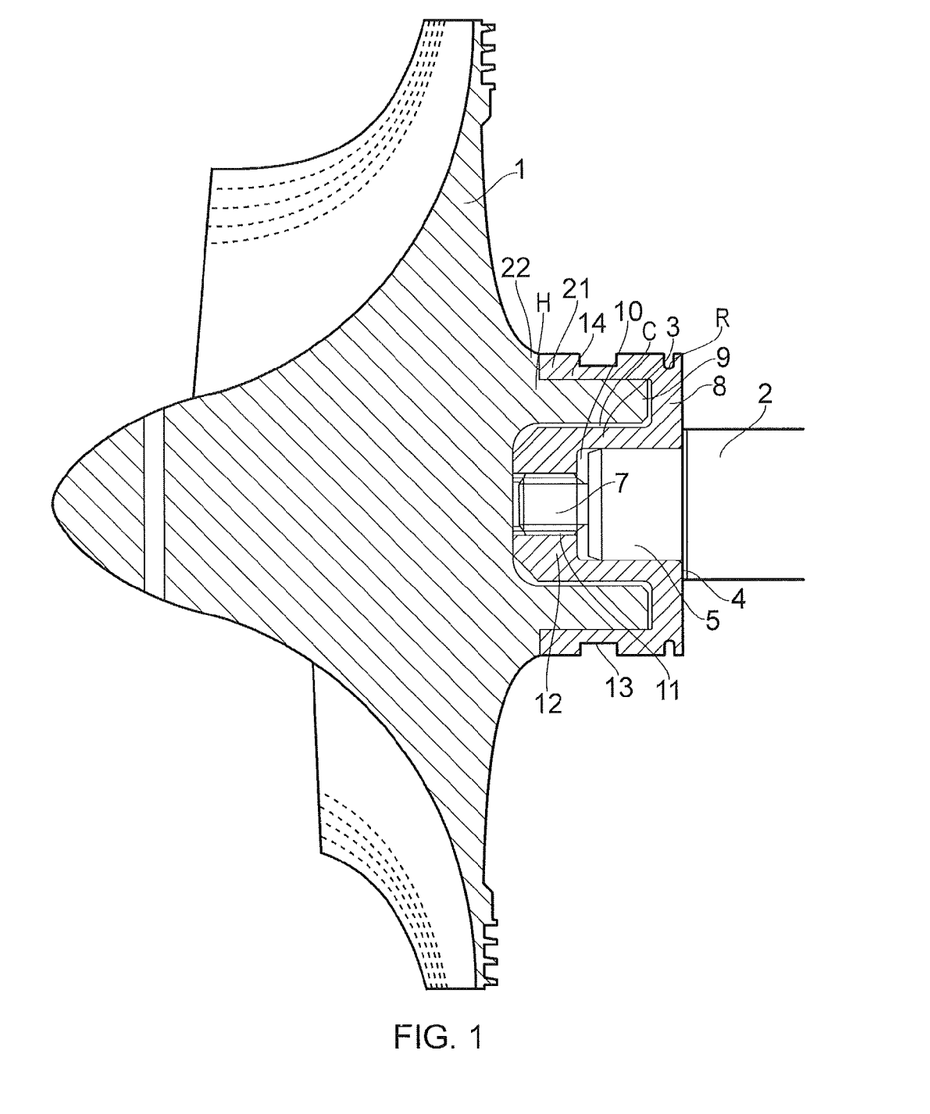
FIG. 1 is a sectional elevation through a turbocharger impeller joined to a shaft by a connector in accordance with an embodiment of the invention.

Referring first to FIG. 1, an aluminium alloy impeller 1 is fitted on to a steel turbocharger shaft 2 by means of a steel connector. The alloy of which the impeller is made (known in the U.S.A. by the designation "2618A") has a relatively high strength for use up to a temperature of about 200° C., having a composition of aluminium with about 2.5 wt. % copper and smaller amounts of magnesium, iron and nickel. The connector may be made of a high tensile steel such as EN26, whose composition includes about 2.5 wt. % nickel, and is located at a hub extension H of the body of impeller 1.

The shaft 2 is formed at its end with a first shoulder 4 surrounding a cylindrical centering portion 5, and a screw-threaded portion 7 of further reduced diameter extending from the end of the centering portion. The steel connector has an insertion part 3 of cup-like shape which is inserted into a central recess formed in the hub extension H, and a cylindrical sleeve portion 14 around the hub extension H. An abutment portion 21 at the impeller side end of the sleeve portion 14 engages against an impeller-side end face 22 of the hub extension H to determine the relative axial positions of the sleeve portion 14 and the hub extension H. A lip portion 8 around the mouth of the insertion part 3 joins the sleeve portion 14 and the insertion part 3. The lip portion 8 has a small clearance from the shaft-side end face 9 of the hub extension H, but is engaged on its other side by the shoulder 4 on the shaft 2. The centering portion 5 of the shaft is received in a corresponding centering portion 10 of the insertion part 3 in a close, but not tight, fit. The end of the insertion part 3 forms a threaded portion 12 having a threaded bore 11 which engages on the screw-threaded portion 7 of the shaft. The threaded portion 12 has a small clearance from the end of the recess.

The sleeve portion 14 is fitted on to the hub extension by heating the connector to cause sleeve portion 14 to expand, and then slipping sleeve portion 14 on to the cylindrical outer surface of the hub extension H where, on cooling, it frictionally grips. The sleeve portion 14 extends over and thereby frictionally contacts most of the axial length of the hub extension H, although in other embodiments the sleeve portion 14 can be extend over only a portion of the axial length, and/or frictional contact can extend between the sleeve portion 14 and the hub extension H over only a portion of the overlap region between the sleeve portion 14 and the hub extension H. It should be noted that the steel of the connector has a lower coefficient of thermal expansion than the aluminium alloy of the impeller and hence the sleeve portion 14 does not expand as much with rising temperature as the hub extension H. This difference in their respective coefficients of expansion ensures that during operation, as the impeller assembly heats up, the joint between the hub extension and the sleeve tightens, reducing any tendency for relative movement between impeller and connector under the influence of centrifugal and thermal stresses, and increasing the torque capacity of the joint.

At its shaft-side end, the outer diameter of the sleeve portion 14 is provided with an oil capture/thrower ring R, which in this embodiment of the invention is machined into the sleeve portion 14. Another option, however, is to form the ring R as a separate component.

Figure 2:
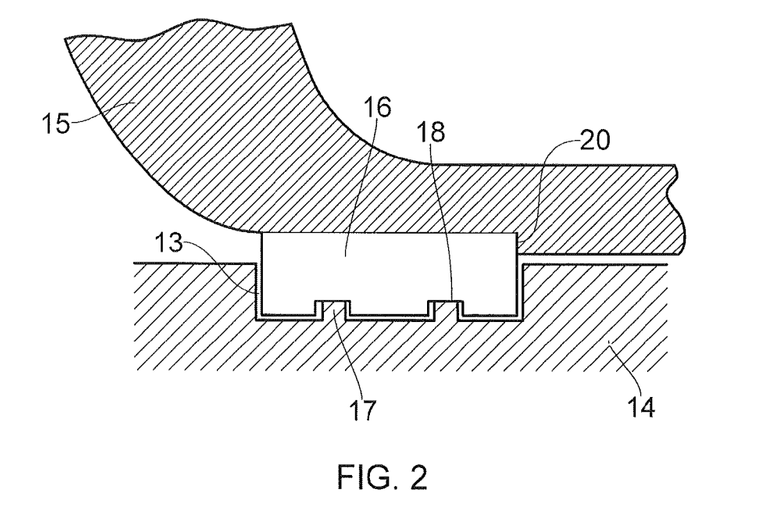
FIG. 2 is a close-up schematic view of a seal between a section of a casing of the impeller of FIG. 1 and a sleeve portion of the connector.

As shown better in FIG. 2, a section 15 of the impeller casing and the outer surface of the sleeve portion 14 are in close proximity to help provide a rotating oil and pressure seal between the impeller 1 and the casing. To improve the seal, the sleeve portion 14 has a recess 13 on its outer surface which receives a sealing ring 16 carried by the casing section 15. To reduce wear between the sealing ring 16 and the sleeve portion 14, the casing section 15 has a small abutment surface 20 on the shaft side (right hand in FIG. 1) of the seal ring 16 and against which the sealing ring 16 rests. To provide enhanced sealing, the sealing ring 16 has annular grooves 18 on its radially inner face, and the recess has corresponding circumferential ribs 17 which are received in the grooves, as described in EP A 1130220. Alternatively, however, the sealing ring can be a plain ring (i.e. without grooves) received in a plain recess (i.e. without ribs). The sealing ring 16 co-operates with the casing section 15 and serves to retain lubricating oil to the shaft side of the assembly and compressed air to the impeller side of the assembly (left hand in FIG. 1). The compressed air is contained between the body of the impeller 1, the sleeve portion 14 with its sealing ring 16, and the impeller casing, within which the impeller assembly is mounted for rotation on overhung bearings (not shown).

The impeller assembly is built up as follows. The connector is warmed, and the sleeve portion 14 is slid on to the cylindrical outer surface of the hub extension H until the abutment portion 21 contacts the end face 22 of the hub extension H. The insertion part 3 of the connector inserts into the central recess of the hub extension H. When the connector cools, a frictional connection is thus formed between the sleeve portion 14 and the hub extension H. However, the connector is sized such that a clearance C prevents the insertion part 3 from contacting the side of the central recess. The screw-threaded portion 7 of the shaft 2 is then screwed onto the threaded portion 12 of the connector, the respective centering portions 5, 10 ensuring the shaft aligns with the axis of the impeller. The threads are screwed until opposing surfaces of the lip portion 8 and shoulder 4 come into abutment, which causes the threads to tighten and provides a rotationally fixed connection between the impeller 1 and the shaft 2.

Advantageously, the connector is a unitary body, which requires only one interference fit with the impeller 1. This reduces the number of high tolerance forming operations, and simplifies the joining procedure of the connector to the impeller 1. Further, because, in operation, the degree of interference increases when the temperature of the joint rises, the degree of interference required on build up can be reduced while maintaining the "walk" resistance and torque capacity of the joint. In addition, by containing the threaded connection between the connector and the shaft 2 in the central recess of the hub extension H, an axially compact arrangement is achieved. The frictional connection between the sleeve portion 14 and the radially outer surface of the hub extension H transmits, in use, substantially all of the torque between the shaft 2 and the impeller 1.

If there is any tendency for the impeller 1 to "walk", advantageously this can be monitored by measuring the size of the gap that would open up between the abutment portion 21 and the end face 22. For this reason, it is preferred that the abutment portion 21 and the end face 22 determine the relative axial positions of the sleeve portion 14 and the hub extension H. Alternative pairs of facing features that could be configured to abut each and thereby determine the relative axial positions (such as the lip portion 8 and the end face 9, or the threaded portion 12 and the end of the recess) are less amenable to inspection.

Figure 3:
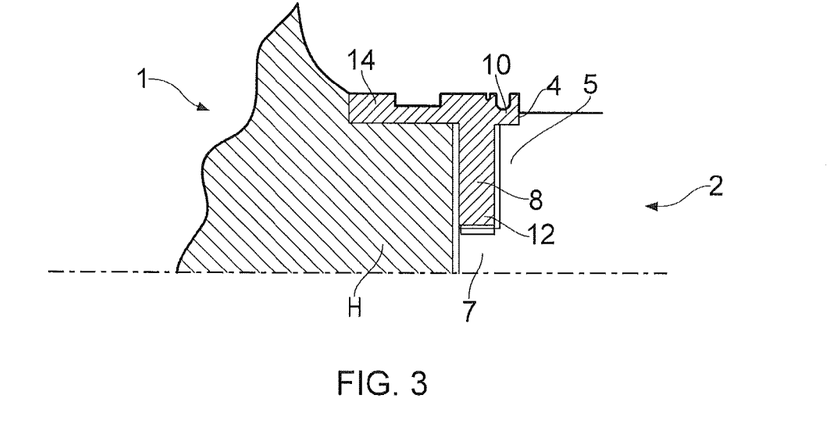
FIG. 3 shows schematically a sectional elevation of a further embodiment of the connector.

FIG. 3 shows schematically a sectional elevation of a further embodiment of the connector. In this embodiment there is no central recess in the hub extension H of the impeller 1. Consequently, there is also no insertion part of the connector. Instead, the threaded portion 12 of the connector is at the radially inner end of the lip portion 8. The centering portion 10 of the connector is in turn formed on the radially inner side and at the shaft-side end of the sleeve portion 14. This makes the tightly toleranced interference surface of the sleeve portion 14 easier to manufacture, but results in an axially longer arrangement.

Figure 4:
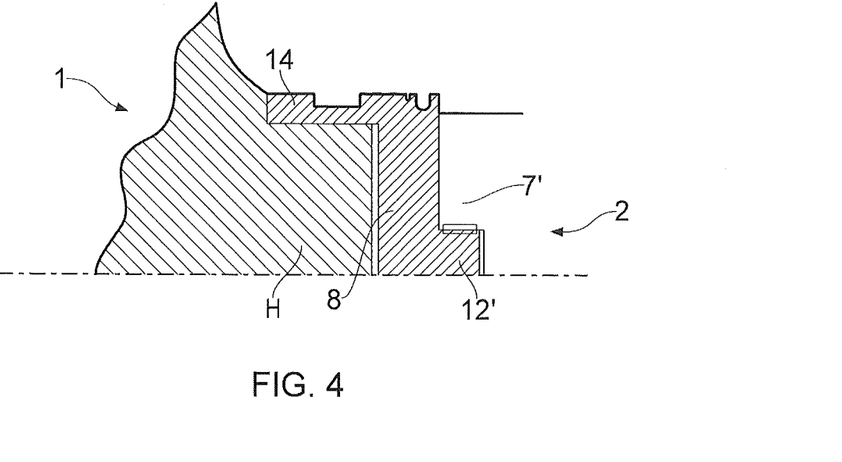
FIG. 4 shows schematically a sectional elevation of a further embodiment of the connector.

FIG. 4 shows schematically a sectional elevation of a further embodiment of the connector. In this embodiment the threaded portion 12' of the connector is formed as a cylindrical boss which fits into a cylindrical recess formed in the shaft 2. The threaded portion 12' carries its thread on a radially outer surface of the boss, while the corresponding threaded portion 7' of the shaft 2 is formed around the cylindrical recess and is threaded on a surface which faces radially inwards.

Figure 5:
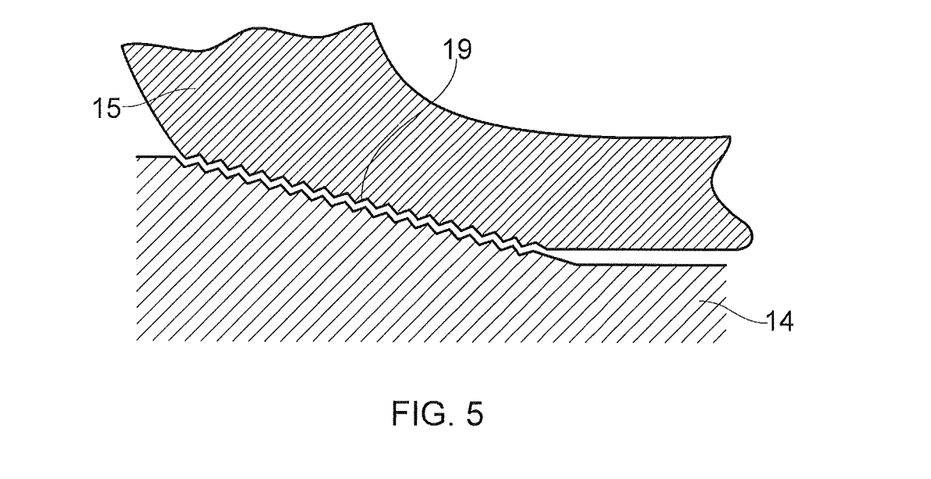
FIG. 5 is a close-up schematic view of a seal between a section of a casing of an impeller and a sleeve portion of a further embodiment of the connector.

FIG. 5 is a close-up schematic view of a seal between a section of a casing of an impeller and a sleeve portion of a further embodiment of the connector. In this case, instead of a seal formed by a sealing ring, the sleeve portion 14 and the casing section 15 have engaging surfaces 19 carrying respective sets of machined grooves which interlock to form a labyrinth seal.

Figure 6:
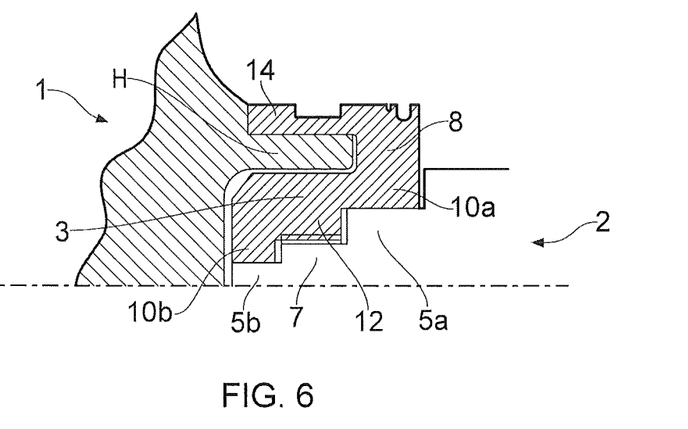
FIG. 6 shows schematically a sectional elevation of a further embodiment of the connector.

FIG. 6 shows schematically a sectional elevation of a further embodiment of the connector. This embodiment is similar to the first embodiment except that the shaft 2 has two centering portions 5a, 5b, and the connector has two corresponding centering portions 10a, 10b. The threaded portions 7, 12 of the shaft 2 and the connector are located axially between the engaging pairs of centering portions such that, on each of the shaft and the connector, the respective diameters of the threaded portions and the centering portions decrease towards the impeller. A further difference relative to the first embodiment is that the threads are tapered, so that merely screwing the threaded portions 7, 12 together results in a rotationally fixed connection between the impeller 1 and the shaft 2.

Figure 7:
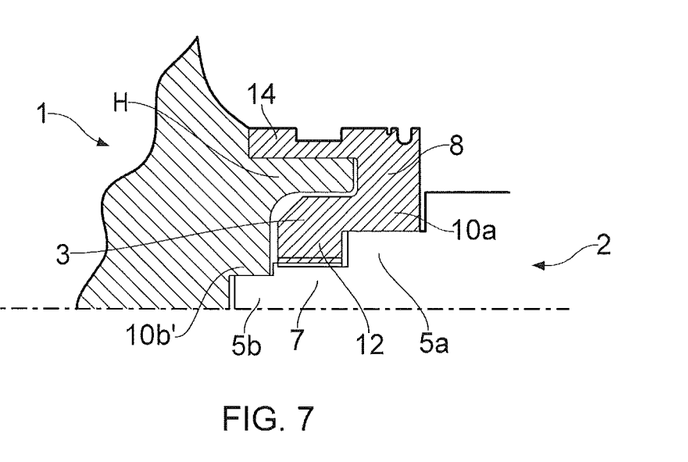
FIG. 7 shows schematically a sectional elevation of a further embodiment of the connector.
Figure 8:
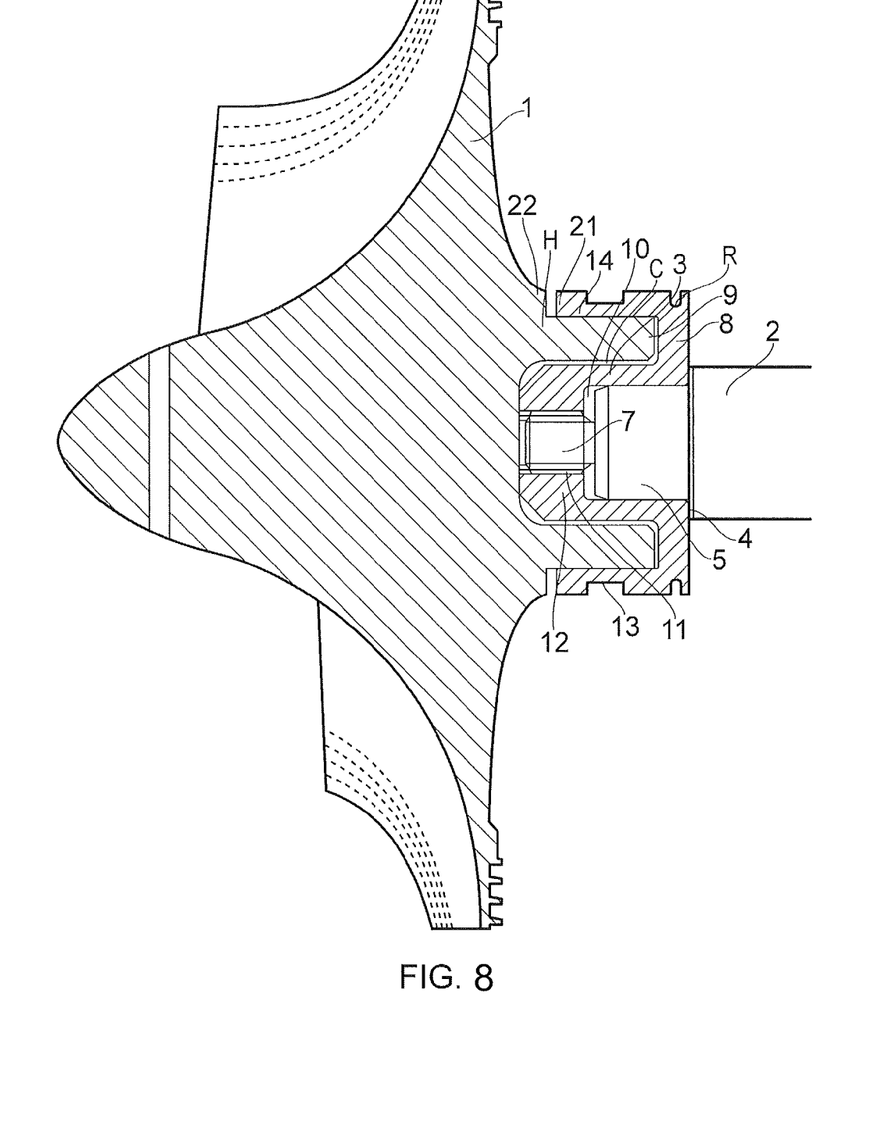
FIG. 8 is a sectional elevation through a turbocharger impeller joined by a shaft by a connector in accordance with a further embodiment of the present invention.

FIG. 7 shows schematically a sectional elevation of a further embodiment of the connector. This embodiment is similar to the embodiment of FIG. 6 except that the impeller-side centering portion 10b' which engages with shaft centering portion 5b is formed by the impeller rather than by the connector. However, FIG. 8 shows a further embodiment of the present invention in which the connector is configured to contact the impeller 1 only on the radially outer surface of the hub extension H.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A connector for connecting an impeller to a shaft, wherein the connector is formed as a unitary body, the connector comprising:

a sleeve portion which is adapted to be frictionally connected on a radially outer surface of a shaft-side hub extension of the impeller, and a threaded portion carrying a thread which is adapted to screw onto a corresponding threaded portion of the shaft such that the connector provides a rotationally fixed connection between the impeller and the shaft; and wherein:

the hub extension has a central recess, and a part of the connector is inserted into the recess, a clearance being provided between the part of the connector inserted into the recess and a side surface of the recess such that there is no contact between the connector and any side surface of the recess; and the frictional connection between the sleeve portion and the radially outer surface of the hub extension transmits, in use, all of the torque between the shaft and the impeller.

2. The connector of claim 1, wherein the connector is configured to contact the impeller only on the radially outer surface of the hub extension.

3. The connector of claim 1, wherein the hub extension has an end face, and the connector has an abutment portion which bears against the end face.

4. The connector of claim 3, wherein the connector is configured to contact the impeller only on the radially outer surface of the hub extension and the end face of the hub extension.

5. The connector of claim 1, wherein the part of the connector inserted into the recess includes the threaded portion of the connector.

6. The connector of claim 1, wherein the connector is formed of a material having a greater strength than the material of the impeller and having a lower coefficient of thermal expansion than the material of the impeller.

7. The connector of claim 1, wherein the sleeve portion extends over at least 50% of an axial length of the hub extension.

8. The connector of claim 1, wherein the connector or the impeller has one or more centering portions having respective engagement surfaces which are adapted to engage with one or more corresponding centering portions of the shaft, the threaded portion of the connector and the centering portions of the connector or the impeller being distributed along the impeller axis.

9. The connector of claim 1, wherein the impeller has a casing and the sleeve portion forms a seal with a section of the casing.

10. The connector of claim 1, wherein the sleeve portion is formed with or carries a circumferential oil thrower formation at its radially outer surface.

11. An impeller having a shaft-side hub extension and fitted with a connector of claim 1, the sleeve portion of the connector being frictionally connected on a radially outer surface of the hub extension.

12. The impeller fitted with a connector of claim 11, wherein the impeller is a metal impeller.

13. The impeller fitted with a connector of claim 11, which impeller is connected to a shaft having a corresponding threaded portion, the thread of the threaded portion of the connector screwing onto the corresponding threaded portion of the shaft.

14. A turbocharger having the connected impeller and shaft of claim 13.

* * * * *